(12) United States Patent
Ariyoshi et al.

(10) Patent No.: US 8,899,103 B2
(45) Date of Patent: Dec. 2, 2014

(54) THERMAL AIR FLOW METER

(71) Applicant: Mitsubishi Electric Corporation, Chiyoda-ku, Tokyo (JP)

(72) Inventors: Yuji Ariyoshi, Chiyoda-ku (JP); Masahiro Kawai, Chiyoda-ku (JP); Koji Tanimoto, Chiyoda-ku (JP); Kazuhiko Otsuka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 22 days.

(21) Appl. No.: 13/927,955

(22) Filed: Jun. 26, 2013

(65) Prior Publication Data

US 2014/0224004 A1     Aug. 14, 2014

(30) Foreign Application Priority Data

Feb. 13, 2013   (JP) .................................. 2013-025123

(51) Int. Cl.

| | |
|---|---|
| *G01F 1/69* | (2006.01) |
| *G01F 1/684* | (2006.01) |
| *G01F 1/692* | (2006.01) |
| *G01F 1/699* | (2006.01) |
| *G01F 1/72* | (2006.01) |
| *G01F 1/696* | (2006.01) |

(52) U.S. Cl.
CPC ............... *G01F 1/69* (2013.01); *G01F 1/6845* (2013.01); *G01F 1/692* (2013.01); *G01F 1/699* (2013.01); *G01F 1/72* (2013.01); *G01F 1/696* (2013.01)
USPC .................... 73/114.34; 73/204.15; 73/204.26

(58) Field of Classification Search
CPC ....... G01F 1/696; G01F 1/6845; G01F 1/699; G01F 1/692; G01F 1/72

USPC .............................. 73/114.34, 204.15, 204.26
See application file for complete search history.

(56) References Cited

U.S. PATENT DOCUMENTS

| | | | | |
|---|---|---|---|---|
| 6,981,411 | B2 * | 1/2006 | Konzelmann et al. ...... | 73/204.26 |
| 7,201,048 | B2 * | 4/2007 | Renninger et al. ......... | 73/204.15 |
| 2004/0261521 | A1 * | 12/2004 | Hecht et al. ................ | 73/204.26 |

FOREIGN PATENT DOCUMENTS

| | | |
|---|---|---|
| JP | 08-014978 A | 1/1996 |
| JP | 08-043163 A | 2/1996 |
| JP | 3470620 B2 | 11/2003 |
| JP | 2005-283604 A | 10/2005 |
| JP | 2012-177702 A | 9/2012 |

OTHER PUBLICATIONS

Japanese Office Action (Notice of Reasons for Rejection), issued Mar. 18, 2014.

* cited by examiner

*Primary Examiner* — Freddie Kirkland, III

(74) *Attorney, Agent, or Firm* — Sughrue Mion, PLLC; Richard C. Turner

(57) ABSTRACT

A thermal air flow meter comprises: a bridge circuit unit that incorporates a bridge circuit including a heating resistor and supplies a current to the heating resistor so that the temperature of the resistor is always set higher by a predetermined temperature than the temperature of intake air detected by an intake-air temperature detection resistor, and outputs an output signal Vm based on the current value supplied to the heating resistor, in accordance with a flow rate of the intake air; a differential amplifier unit that amplifies a voltage dependent on difference in temperature between an upstream heating resistor and downstream heating resistor; and a subtraction processor that subtracts from the output signal Vm a constant times an output voltage Vd1 from the differential amplifier unit, and outputs a correction output signal Vout.

13 Claims, 21 Drawing Sheets

FIG. 7
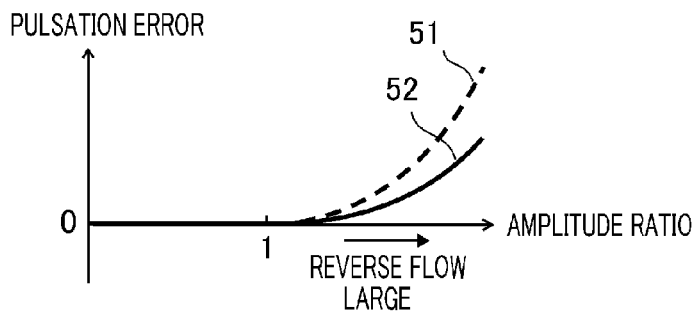
PULSATION ERROR =
DETECTION AVERAGE FLOW RATE / TRUE AVERAGE FLOW RATE − 1
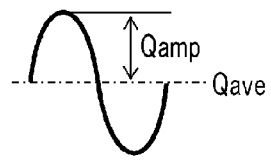
AMPLITUDE RATIO = Qamp / Qave
FIG. 8
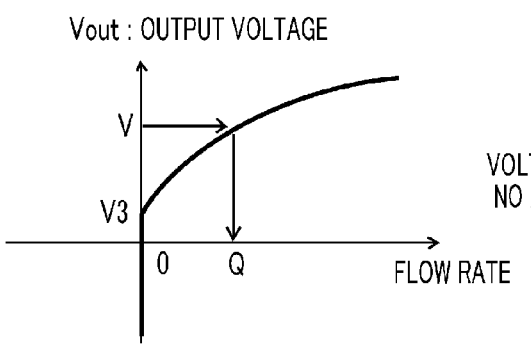
VOLTAGE WHEN NO AIR FLOW →
VOLTAGE-FLOW-RATE TABLE
| Vout | Q |
|---|---|
| V1 | 0 |
| V2 | 0 |
| V3 | 0 |
| V4 | Q4 |
| V5 | Q5 |
| : | : |
| Vn | Qn |

THERMAL AIR FLOW METER

BACKGROUND OF THE INVENTION

1. Field of the Invention

The present invention relates to thermal air flow meters suited to measure intake air flow rates of internal combustion engines, for example.

2. Description of the Related Art

A thermal air flow meter capable of directly measuring a mass flow rate has been widely used in an electrically-controlled fuel injection system for an engine of a motor vehicle etc; however, a pulsation flow accompanied with a reverse flow takes place under the condition of a heavy load as well as low engine rotation speed, thereby causing a large error in a conventional thermal air flow meter incapable of detecting the reverse flow. In order to reduce the error in measuring this pulsation flow accompanied with the reverse flow, a method has been proposed in which an air flow direction is detected and an intake air flow rate signal is corrected only when the reverse flow is detected.

For example, Patent Document 1 describes a method by which a signal related to the air flow direction is generated from difference in potential between an upstream resistor and downstream resistor of a heating resistor, and while this direction signal is indicating a reverse flow, the flow rate signal is reversed and counted as a negative value. This signal processing is outlined in FIG. 28, in which the flow rate signal is reversed in a region where the direction signal is 'Low' (region of reverse air flow taking place), so as to become negative.

Moreover, Patent Document 2 also describes a method of detecting the air flow direction. As shown in FIG. 29, a constant-temperature-difference drive bridge circuit is configured using a heating resistor 104, a temperature-compensating resister 107 and a plurality of fixed resisters, and the potential at a midpoint of the bridge circuit is taken out as a flow rate signal. On the other hand, a bridge circuit is configured using an upstream temperature detection resistor 105 located upstream of the heating resistor 104 and a downstream temperature detection resistor 106 located downstream of the heating resistor 104, and potential difference between the midpoints of the bridge circuit is taken out as a direction signal. The flow rate signal and direction signal are input to a microcomputer 115; when it is determined that a reverse flow is taking place, twice the flow rate signal during the period of the reverse flow taking place is subtracted from the flow rate signal so as to correct the signal.

Moreover in Patent Document 3, when it is determined based on the direction signal that a reverse flow is taking place, twice the flow rate signal during the period of the reverse flow taking place is similarly subtracted from the flow rate signal so as to correct the signal (see FIG. 30).

Patent document 1: Japanese Patent Publication No. 3470620

Patent document 2: Japanese Laid-open Patent Publication No. H08-14978

Patent document 3: Japanese Laid-open Patent Publication No. H08-43163

A method of correcting the flow rate signal based on the direction signal is adopted in the foregoing conventional example, so the method of processing the flow rate signal needs to be selectively switched over depending on which is taking place, a forward flow or reverse flow, which consequently requires a switch that is switched over in accordance with the direction signal and a microcomputer and the like that determine the direction. The signal processing is carried out in an engine control circuit in Patent document 3, and it is assumed also in Patent documents 1 and 2 to use a microcomputer for the processing. Therefore, a problem has been that when the same processing as that in the conventional example is carried out, the configuration becomes complicated and the circuit size increases. In addition, there has been another problem in that its cost is thereby also pushed up.

On the other the hand, for the purpose of improving fluctuation of characteristics (contamination characteristics) when fine dust sticks to a detection element, protecting the detection element from damaging due to coarse dust colliding with the detection element or backfire from the engine, making correction for lean output under high-frequency pulsation, etc., there has been widely used a thermal air flow meter configured in such away that a sub-passage called a bypass is provided in a main passage and the detection element is disposed inside this bypass. This bypass is a passage whose inlet is connected with its outlet with a curved passage, and in most cases the relation between a forward flow rate and output (forward flow characteristics) differs from that between a reverse flow rate and output (reverse flow characteristics).

Therefore, when the bypass is adopted, a dedicated map for the reverse flow needs to be prepared in order to obtain a flow rate during the reverse flow taking place, thereby causing a problem in that its system becomes complicated. Moreover, another problem has been that when the processing is carried out using only a forward flow map without preparing the reverse flow one, accurate correction cannot be made only by subtracting from the flow rate signal twice the flow rate signal during the reverse flow taking place.

SUMMARY OF THE INVENTION

The present invention has been made to solve the foregoing problems with the conventional art, and aims at providing a thermal air flow meter that can achieve accurate air flow rate measurement using a low-cost configuration, even when a pulsation flow accompanied with a reverse flow taking place.

A thermal air flow meter according to the present invention includes: a bypass that takes in part of intake air to be measured and allows the intake air to flow therethrough; a flow rate detection element that is disposed in the bypass and includes a heating resistor made up of an upstream heating resistor located upstream of the intake air and a downstream heating resistor located downstream of the intake air and an intake-air temperature detection resistor that detects the intake air temperature; and a bridge circuit unit that incorporates a bridge circuit including the heating resistor and supplies a current to the heating resistor so that the heating resistor temperature is always set higher by a predetermined temperature than the intake air temperature detected by the intake-air temperature detection resistor; wherein the bridge circuit unit outputs an output signal based on the current value supplied to the heating resistor, in accordance with a flow rate of the intake air. The thermal air flow meter comprises: a differential amplifier unit that amplifies a voltage dependent on difference in temperature between the upstream heating resistor and downstream heating resistor; and a subtraction processor that subtracts from the output signal a constant times an output signal from the differential amplifier unit, and outputs a correction signal.

According to the present invention, an effect is produced in which a thermal air flow meter can be obtained that can accurately measure the flow rate using a low-cost configuration, even when a pulsation flow accompanied with a reverse flow takes place.

The foregoing and other object, features, aspects and advantages of the present invention will become more apparent from the following detailed description of the present invention when taken in conjunction with the accompanying drawings.

BRIEF DESCRIPTION OF THE DRAWINGS

FIG. 7 is an explanatory view showing a pulsation error according to Embodiment 1 of the invention;

FIG. 8 is an explanatory view showing a voltage-flow-rate table according to Embodiment 1 of the invention;

DETAILED DESCRIPTION OF THE PREFERRED EMBODIMENTS

Embodiment 1

Figure 1:
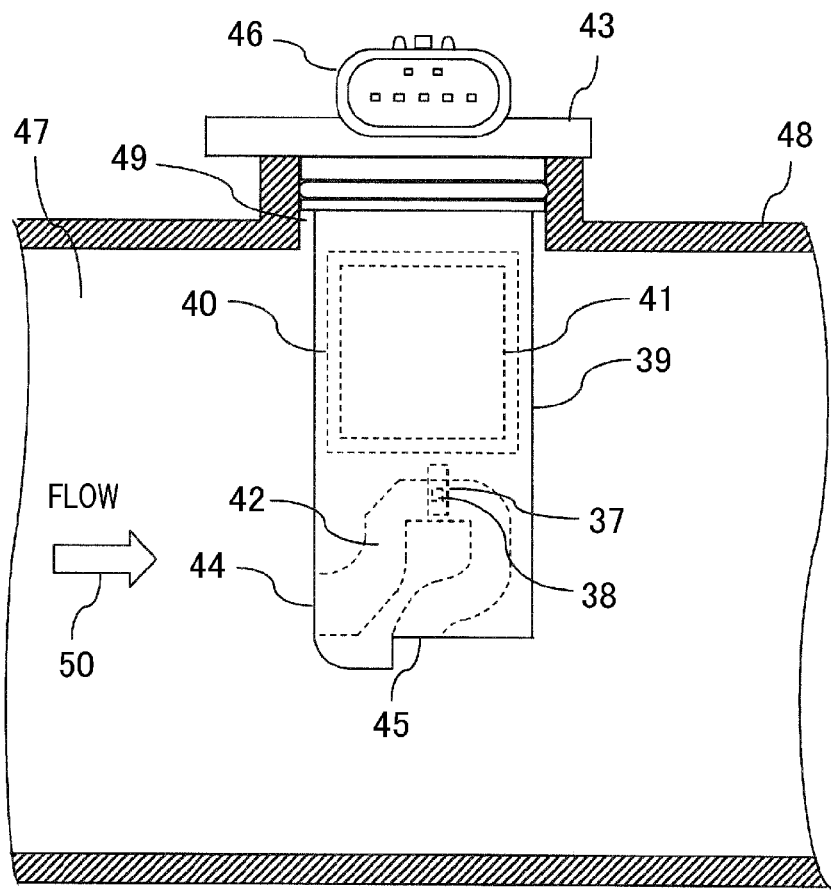
FIG. 1 is a front view of a thermal air flow meter according to Embodiment 1 of the present invention.

FIG. 1 is a front view of a thermal air flow meter according to Embodiment 1 of the present invention, being fixed to a pipe 48 of an internal combustion engine. A main unit 39 of the thermal air flow meter is inserted into the pipe 48 through an insertion hole 49 and fixed to the pipe 48 with a flange 43. A connector 46, a circuit housing 40 and a bypass 42 are formed in the main unit 39 along the insertion direction into the pipe 48. Inside the bypass 42 is disposed a flow rate detection element 37 with a detector 38 provided on a surface of the element, and inside the circuit housing 40 is housed a circuit board 41 mounted with a control circuit that drives the flow rate detection element 37 and processes a signal from the element. A power supply for driving the circuit and a flow rate signal are connected to the outside through the connector 46.

The bypass 42 is provided with: an inlet 44 opening toward the upstream side in a flowing direction 50 of a main stream of intake air that is a fluid to be measured and flows in a main passage 47, in a plane perpendicular to the flowing direction 50 of the main stream in the main unit 39; and an outlet 45 opening in a plane parallel to the flowing direction 50 of the main stream in the main unit 39 and perpendicular to the insertion direction. Part of the intake air to be measured flows into the bypass 42 from the inlet 44, its flow rate is measured by the detector 38 of the flow rate detection element 37 disposed inside the bypass 42, and following that the part of the intake air flows out of the outlet 45 to join the main stream.

Figure 2:
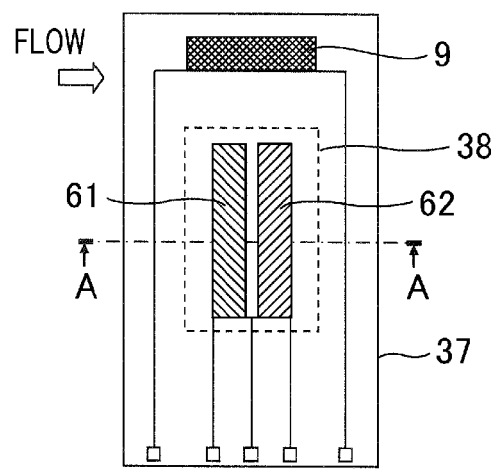
FIG. 2 is a top view of a detector of the thermal air flow meter according to Embodiment 1 of the invention.

FIG. 2 is a top view of the flow rate detection element 37 of the thermal air flow meter according to Embodiment 1 of the present invention. The detector 38 is formed on the surface of the flow rate detection element 37 and a heating resistor 6 is formed inside the detector 38. The heating resistor 6 includes an upstream heating resistor 61 located upstream of the intake air and downstream heating resistor 62 located downstream of the intake air. Moreover, an intake-air temperature detection resistor 9 is formed on a portion other than the detector 38 on the surface of the flow rate detection element 37.

Figure 3:
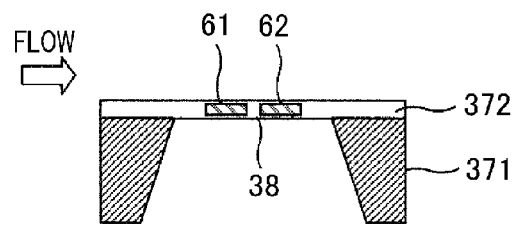
FIG. 3 is a cross-sectional view along the line A-A in FIG. 2.

FIG. 3 is a cross-sectional view along the line A-A in FIG. 2. The flow rate detection element 37 includes a silicon substrate 371 and insulation film 372 formed on its surface, and the upstream heating resistor 61 and downstream heating resistor 62 are formed inside the insulation film 372. The silicon substrate on the back side of the detector 38 is partly removed using technologies such as etching, and as a result the detector 38 has a thin-film structure.

Figure 4:
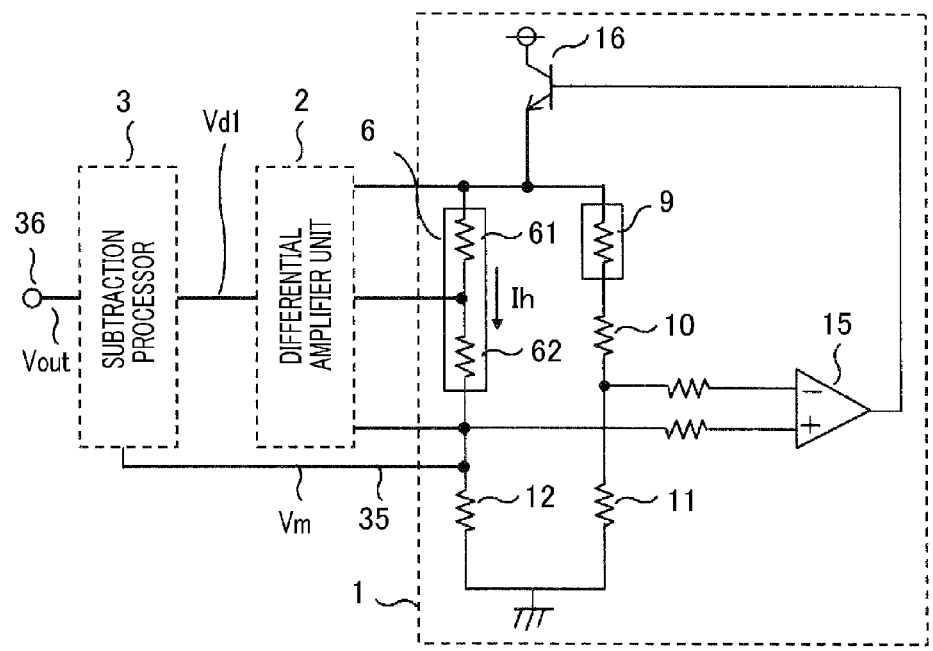
FIG. 4 is a circuit configuration diagram of the thermal air flow meter according to Embodiment 1 of the invention.

FIG. 4 is a diagram showing a circuit configuration of the thermal air flow meter according to Embodiment of the present invention. A bridge circuit unit 1 includes abridge circuit that is made up of the upstream heating resistor 61, downstream heating resistor 62, intake-air temperature detection resistor 9 and fixed resistors 10, 11 and 12, and outputs a bridge output 35. Intermediate potentials of the bridge circuit are input to an operational amplifier 15, and a voltage based on the difference between the intermediate potentials is output from the operational amplifier 15 and fed back to a transistor 16 at the top of the bridge circuit unit 1. A heating current Ih flows through the heating resistor 6, which generates Joule heat in the heating resistor 6. The bridge circuit unit 1 is configured in such a way that this Joule heat keeps the temperature of the heating resistor 6 higher by a constant temperature than that of the intake-air temperature detection resistor 9.

The larger the flow rate of air flowing above the detector 38 becomes, the more heat transmitted to the air from the heating resistor 6 increases; therefore in order to keep the temperature of the heating resistor 6 constant regardless of the air flow rate, the heating current Ih dependent on the air flow rate will be required. Therefore, the air flow rate can be detected by measuring the heating current Ih as a bridge output voltage Vm that is equivalent to the voltage across the fixed resistor 12.

Moreover in FIG. 4, the voltage across the heating resistor 6 and that at the connection point between the upstream heating resistor 61 and downstream heating resistor 62 are input to a differential amplifier unit 2, and then a voltage dependent on the difference in temperature between the upstream heating resistor 61 and downstream heating resistor 62 is output.

Let the resistance Rhu of the upstream heating resistor 61 and resistance Rhd of the downstream heating resistor 62 be expressed as a function of temperature as given by Equations (1) and (2), respectively, and the current flowing through both resistors be Ih.

Equation 1

$$Rhu = Rhu0(1 + \alpha Thu) \quad (1)$$

Equation 2

$$Rhd = Rhd0(1 + \alpha Thd) \quad (2)$$

where Rhu0 and Rhd0 are resistance values of the upstream heating resistor 61 and downstream heating resistor 62 at a temperature of 0° C., respectively; Thu and Thd are temperatures of the upstream heating resistor 61 and downstream heating resistor 62, respectively; and α is the temperature coefficient of the upstream heating resistor 61 and downstream heating resistor 62.

Since the upstream heating resistor 61 and downstream heating resistor 62 are made of the same material, their temperature coefficients are assumed to be the same. Hereinafter, a case of the resistor temperature coefficient α being positive will be discussed.

The differential amplifier unit 2 is configured to output an output voltage Vd1 expressed by Equation (3).

Equation 3

$$Vd1 = G1(Rhu - Rhd)Ih \quad (3)$$

where G1 is the gain of the differential amplifier unit 2.

When the air flow is a forward flow, air flows from the upstream heating resistor 61 toward the downstream heating resistor 62; therefore the temperature of the upstream heating resistor 61 becomes lower than that of the downstream heating resistor 62, so that Vd1 becomes negative. Meanwhile, when the air flow is a reverse flow, the air flows from the downstream heating resistor 62 toward the upstream heating resistor 61; therefore the temperature of the upstream heating resistor 61 becomes higher than that of the downstream heating resistor 62, so that Vd1 becomes positive. If power supply for the differential amplifier unit 2 is configured with a single power supply, Vd1=0 when the air flows in the forward direction, so positive Vd1 is output only when the air flows in the reverse direction.

A subtraction processor 3 is configured to output at the output terminal 36 an output voltage of Vout expressed by Equation (4) as a correction output signal.

Equation 4

$$Vout = G2(Vm - G3 \cdot Vd1) \quad (4)$$

where G2 and G3 are constant coefficients.

Figure 5:
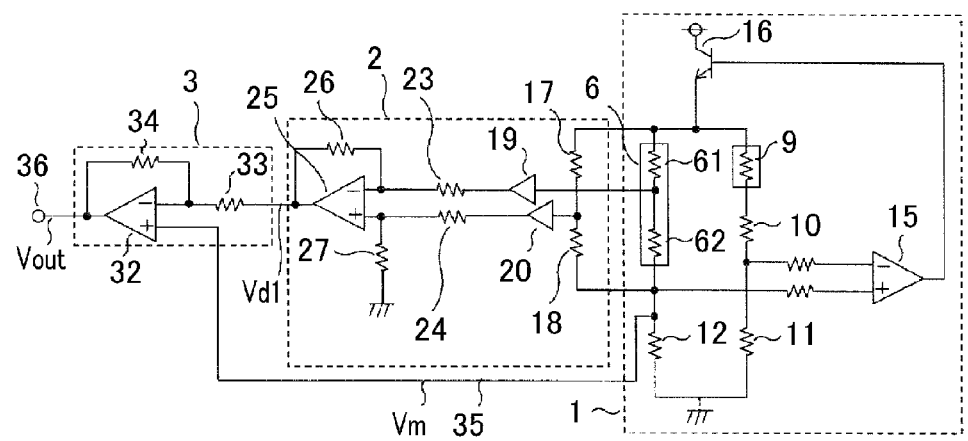
FIG. 5 is a circuit configuration diagram exemplifying a specific circuit of FIG. 4.

A specific circuit configuration for the differential amplifier unit 2 and subtraction processor 3 according to this Embodiment is exemplified in FIG. 5. In the differential amplifier unit 2, fixed resistors 17 and 18 connected in series are connected in parallel to the heating resistor 6, the voltage at the connection point between the upstream heating resistor 61 and downstream heating resistor 62 is input to a buffer 19, and the voltage at the connection point between the fixed resistors 17 and 18 is input to a buffer 20. Output from the buffer 19 is connected to the inverting input terminal of an operational amplifier 25 via a resistor 23, and output from the buffer 20 is connected to the non-inverting input terminal of the amplifier via a resistor 24. Furthermore, a resistor 26 is connected between the inverting input terminal of the operational amplifier 25 and the output terminal thereof, and a resistor 27 is connected between the non-inverting input terminal and ground.

If resistance values of the fixed resistors 17 and 18 and resistors 23, 24, 26 and 27 are R17, R18, R23, R24, R26 and R27, respectively, the output voltage Vd1 from the differential amplifier unit 2 is expressed by Equation (5), where R17=R18, Rf=R26=R27 and Ri=R23=R24.

Equation 5

$$Vd1 = \frac{Rf}{2Ri}(Rhu - Rhd)Ih \quad (5)$$

Therefore, the gain G1 of the circuit in FIG. 5 is expressed by Equation (6).

Equation 6

$$G1 = \frac{Rf}{2Ri} \quad (6)$$

In the subtraction processor 3, the output voltage Vd1 from the differential amplifier unit 2 is connected to the inverting input terminal of an operational amplifier 32 via a resistor 33, and the bridge output voltage Vm is connected to the non-inverting input terminal of the operational amplifier. In addition, a resistor 34 is connected between the inverting input terminal and output terminal of the operational amplifier 32. If resistance values of the resistors 33 and 34 are R33 and R34, respectively, the output voltage Vout from the subtraction processor 3 is expressed by Equation (7).

Equation 7

$$Vout = \left(1 + \frac{R34}{R33}\right)\left(Vm - \frac{R34}{R33 + R34} \cdot Vd1\right) \quad (7)$$

Therefore, the coefficients G2 and G3 of the circuit in FIG. 5 are expressed by Equation (8).

Equation 8

$$G2 = 1 + \frac{R34}{R33} \quad G3 = \frac{R34}{R33 + R34} \quad (8)$$

Figure 6:
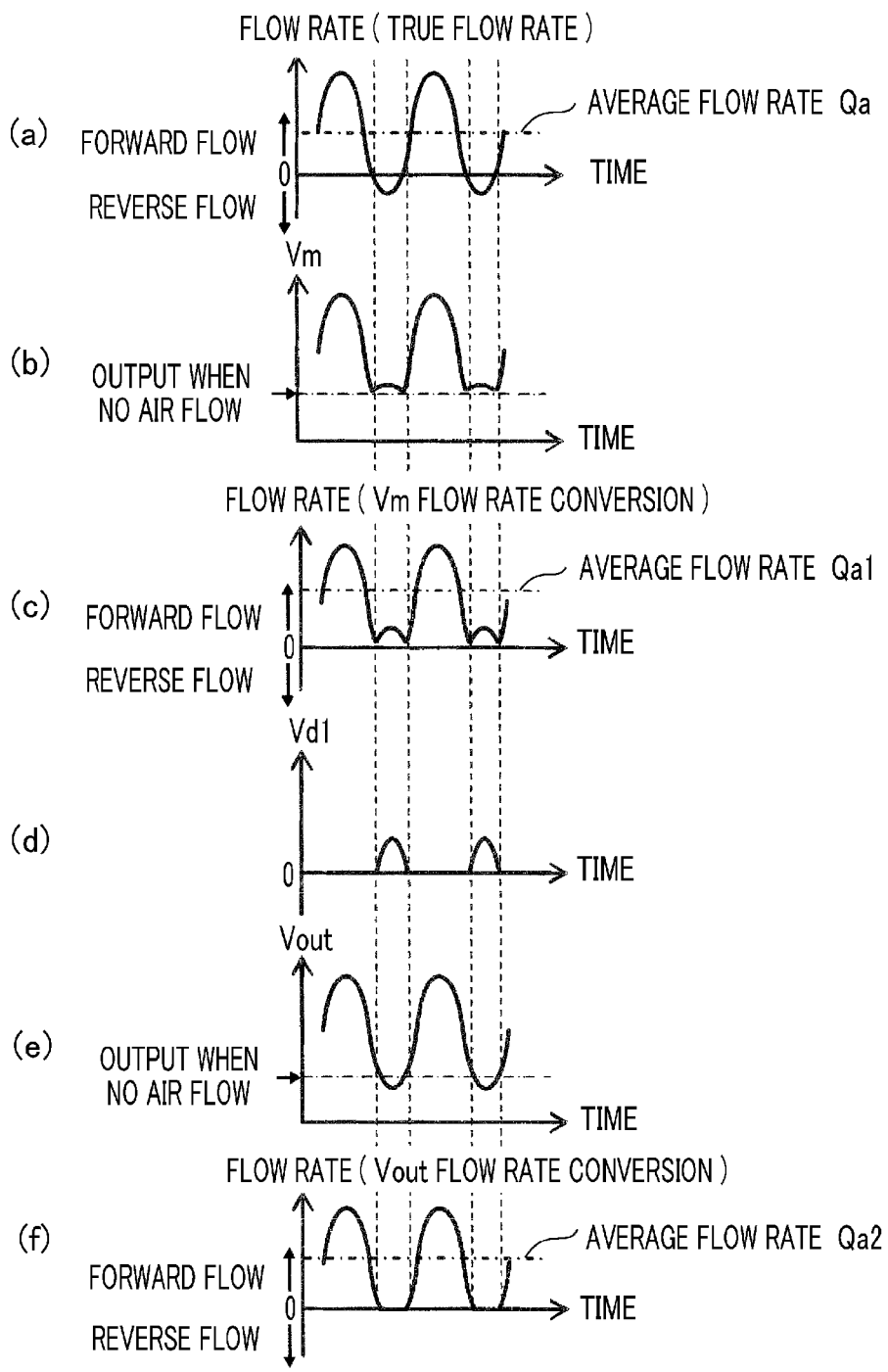
FIG. 6 is an operating waveform view according to Embodiment 1 of the invention.

FIG. 6 shows operating waveforms in this Embodiment. When a pulsation flow accompanied with a reverse flow takes place as shown in FIG. 6 (a), the bridge output voltage Vm as shown in FIG. 6 (b) becomes higher when the reverse flow takes place than when there is no air flow. Therefore, if this voltage Vm is converted into a flow rate as it is, a waveform as FIG. 6 (c) is obtained in which the waveform when the reverse flow taking place is folded back in the forward flow side. Although accuracy of an average flow rate during one pulsating period is important in engine control, an average flow rate (Qa1) detected with the voltage Vm converted into the flow rate as it is becomes larger than the true average flow rate (Qa), thereby causing a detection error (hereinafter referred to as a pulsation error).

The curve 51 as shown in FIG. 7 is obtained, with an amplitude ratio on the horizontal axis and the pulsation error on the vertical axis. The greater the amplitude ratio and also the reverse flow rate, the larger the pulsation error. Additionally in FIG. 7, the pulsation error represents [detection average flow rate]/[true average flow rate]−1, and the amplitude ratio represents [pulsation amplitude value Qamp]/[pulsation average value Qave].

FIG. 6 (d) represents the waveform of Vd1 expressed by Equation (3). As explained above, Vd1 becomes a positive voltage only when a reverse flow taking place and becomes zero when a forward flow taking place. The waveform of Vout as shown in FIG. 6 (e) can be obtained by subtracting G3 times this Vd1 from Vm, according to Equation (4). By subtracting the G3 times Vd1 from Vm, Vout in the reverse flow region partly becomes lower than the output when there is no air flow. As shown in FIG. 8, when Vout lower than the output when there is no air flow is generated, if a voltage-flow-rate table is set so that the flow rate becomes zero, the flow-rate conversion of Vout in FIG. 6 (e) becomes as shown in FIG. 6 (f). Since the flow rate is calculated as zero in part of the reverse flow region, a detecting average flow rate (Qa2) becomes smaller than the average flow rate (Qa1) in FIG. 6 (c).

If expressed in FIG. 7, the pulsation error will be as given by the curve 52, so the pulsation error becomes smaller than that given by the curve 51 in a region of the amplitude ratio being high. According to this Embodiment, as described above, the pulsation error when a pulsation flow accompanied with a reverse flow taking place can be reduced using a simple circuit.

Embodiment 2

Figure 9:
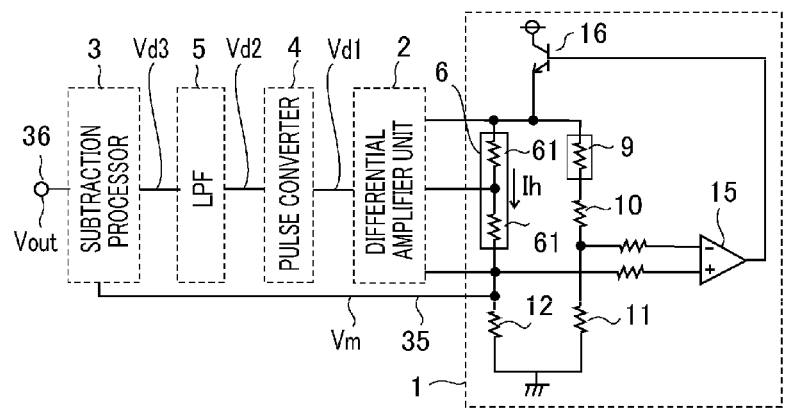
FIG. 9 is a circuit configuration diagram of a thermal air flow meter according to Embodiment 2 of the invention.

The output voltage Vd1 from the differential amplifier unit 2 has been directly subtracted from the bridge output voltage Vm in Embodiment 1; in this Embodiment 2, however, Vd1 is input to a pulse converter 4 to be converted into a pulse voltage Vd2, this Vd2 is input to an LPF (low-pass filter) 5 to be converted into a smoothed voltage Vd3, and then this Vd3 is input to the subtraction processor 3 so as to subtract this voltage from the bridge output voltage Vm, as shown in FIG. 9. Therefore, the subtraction processor 3 outputs the output voltage Vout expressed by Equation (9).

Equation 9

$$V\text{out}=G2(Vm-G3\cdot Vd3) \quad (9)$$

Figure 10:
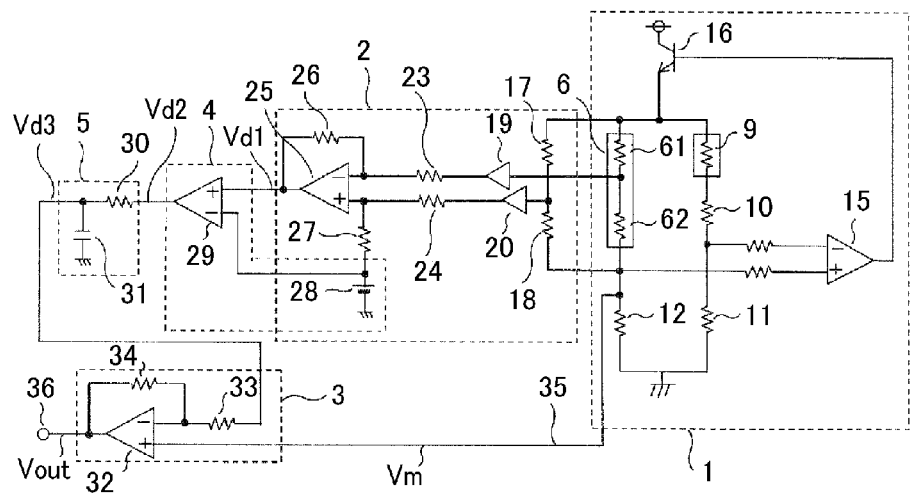
FIG. 10 is a circuit configuration diagram exemplifying a specific circuit of FIG. 9.

A specific circuit configuration for the pulse converter 4 and LPF 5 according to this Embodiment is exemplified in FIG. 10. The output voltage Vd1 from the differential amplifier unit 2 is connected to the non-inverting terminal of a comparator 29 and a reference voltage supply 28 is connected to the inverting terminal of the comparator in the pulse converter 4. The reference voltage supply 28 is also connected to the resistor 27 of the differential amplifier unit 2 at the lower side. Here, the reference voltage supply 28 may be ground, the same as Embodiment 1, or may be any other fixed voltage. When the output voltage Vd1 from the differential amplifier unit 2 is higher than the voltage (V28) of the reference voltage supply 28, the pulse converter 4 outputs 'High' voltage, whereas outputs 'Low' voltage when it is lower than the voltage (V28). The value of 'High' voltage is determined depending on the power supply voltage to the comparator 29. As described above, the pulse converter 4 outputs the voltage Vd2 that is a pulse voltage converted from Vd1.

The LPF 5 is a simplest first-order low-pass filter made up of a resistor 30 and capacitor 31. Of course, the LPF may be a second- or higher-order low-pass filter, or a low-pass filter with any other configuration. The cutoff frequency thereof is set to a value lower than the frequency of the pulsation flow.

Figure 11:
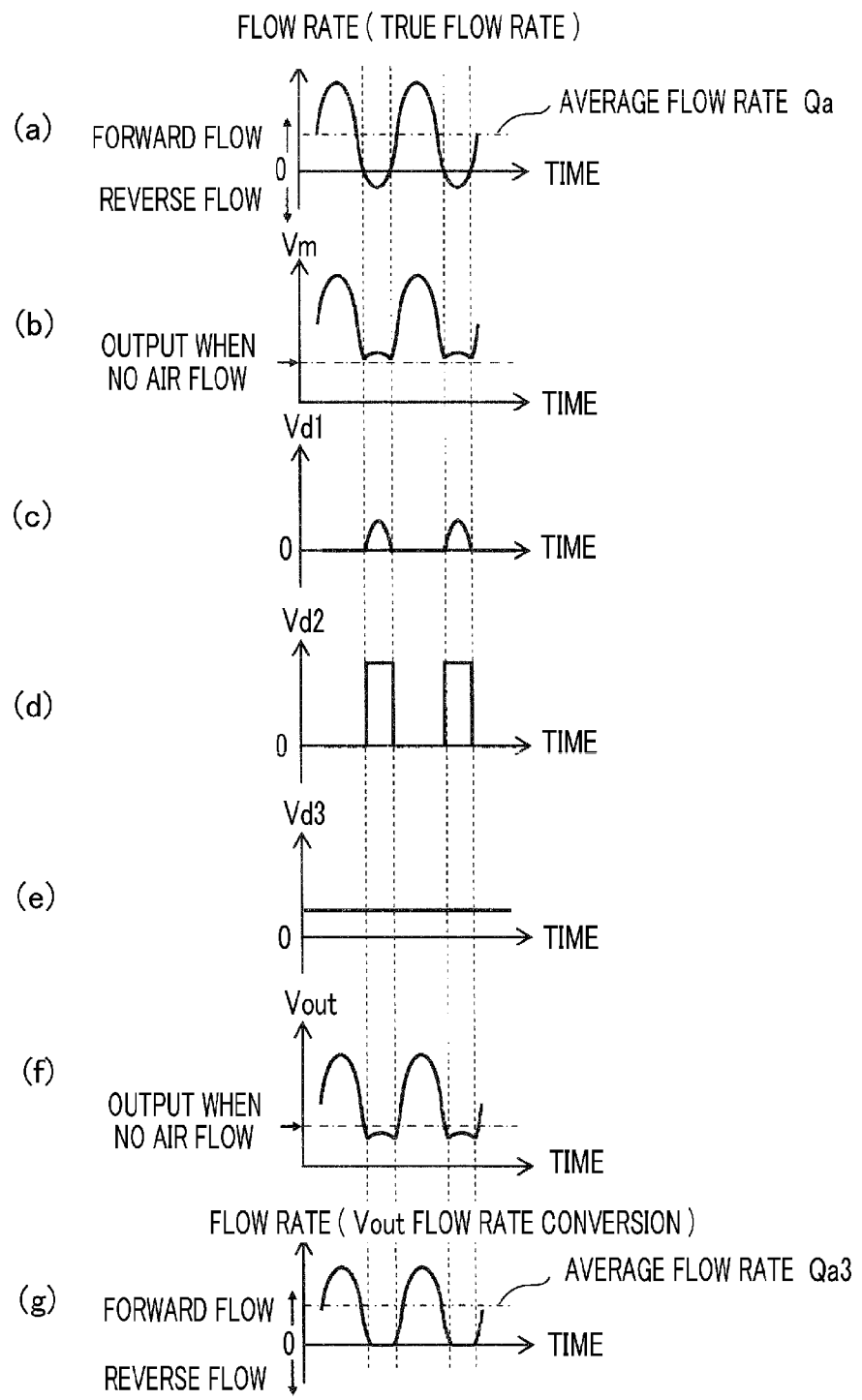
FIG. 11 is an operating waveform view according to Embodiment 2 of the invention.

Operating waveforms according to this Embodiment 2 are shown FIG. 11. When a pulsation flow accompanied with a reverse flow takes place as shown in FIG. 11 (a), the voltage Vd1 becomes positive only when the reverse flow taking place and zero when the forward flow taking place as shown in FIG. 11 (c), the same as Embodiment 1. The waveform of the voltage Vd2 obtained by inputting this Vd1 to the pulse converter 4 and then converting into a pulse waveform becomes as shown in FIG. 11 (d), so 'High' voltage is output only when the reverse flow taking place.

When the amplitude ratio becomes higher so that the reverse flow rate increases, the duty ratio of Vd2 becomes greater. The waveform of the voltage Vd3 obtained by inputting this Vd2 to the LPF 5 to smooth becomes as shown in FIG. 11 (e), and as a result a DC voltage proportional to the duty ratio of Vd2 is output. The waveform of Vout as shown in FIG. 11 (f) can be obtained by subtracting G3 times this Vd3 from Vm, according to Equation (9). By subtracting the G3 times Vd3 from Vm, Vm decreases as a whole, and Vout near the reverse flow region becomes lower than the output when there is no air flow.

Figure 12:
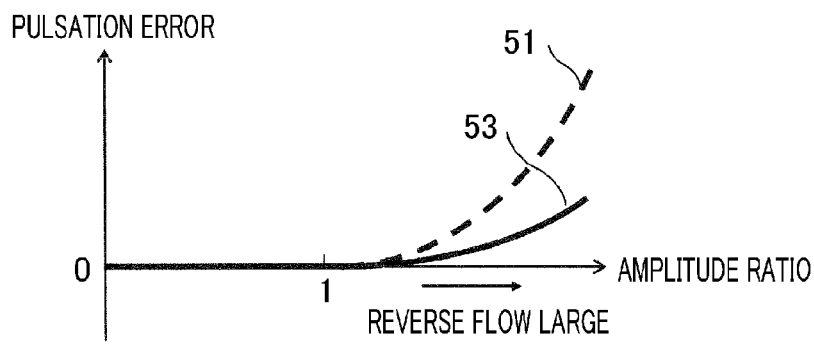
FIG. 12 is an explanatory view showing a pulsation error according to Embodiment 2 of the invention.

When Vout lower than the output when there is no air flow is generated as shown in FIG. 8, if the voltage-flow-rate table is set such that the flow rate=0, the flow-rate conversion of Vout in FIG. 11 (f) becomes as shown in FIG. 11 (g). Since the flow rate is calculated as zero near the reverse flow region, a detecting average flow rate (Qa3) becomes smaller than the average flow rate (Qa1) in FIG. 6 (c). If expressed using the relation between the amplitude ratio and pulsation error, this becomes as given by the curve 53 in FIG. 12, which indicates the pulsation error becomes smaller than that by the curve 51. As described above, the pulsation error when a pulsation flow accompanied with a reverse flow takes place can be reduced using a simple circuit in this Embodiment as well.

Embodiment 3

Figure 13:
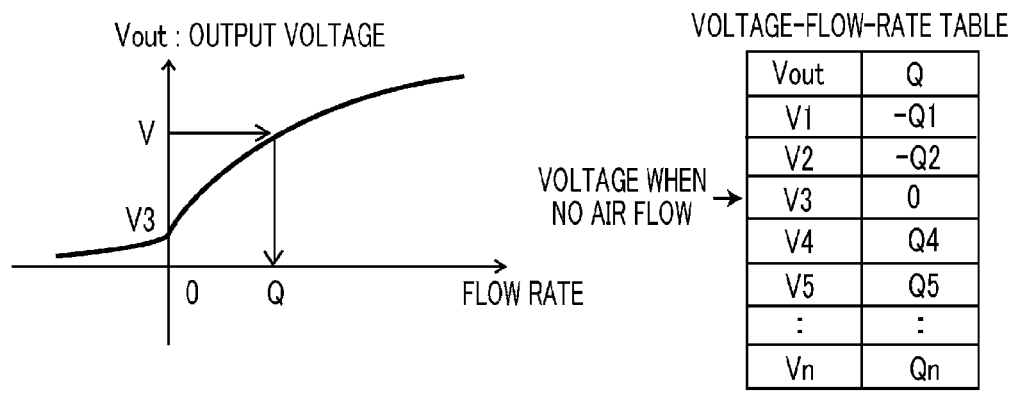
FIG. 13 is an explanatory view showing a voltage-flow-rate table according to Embodiment 3 of the invention.
Figure 14:
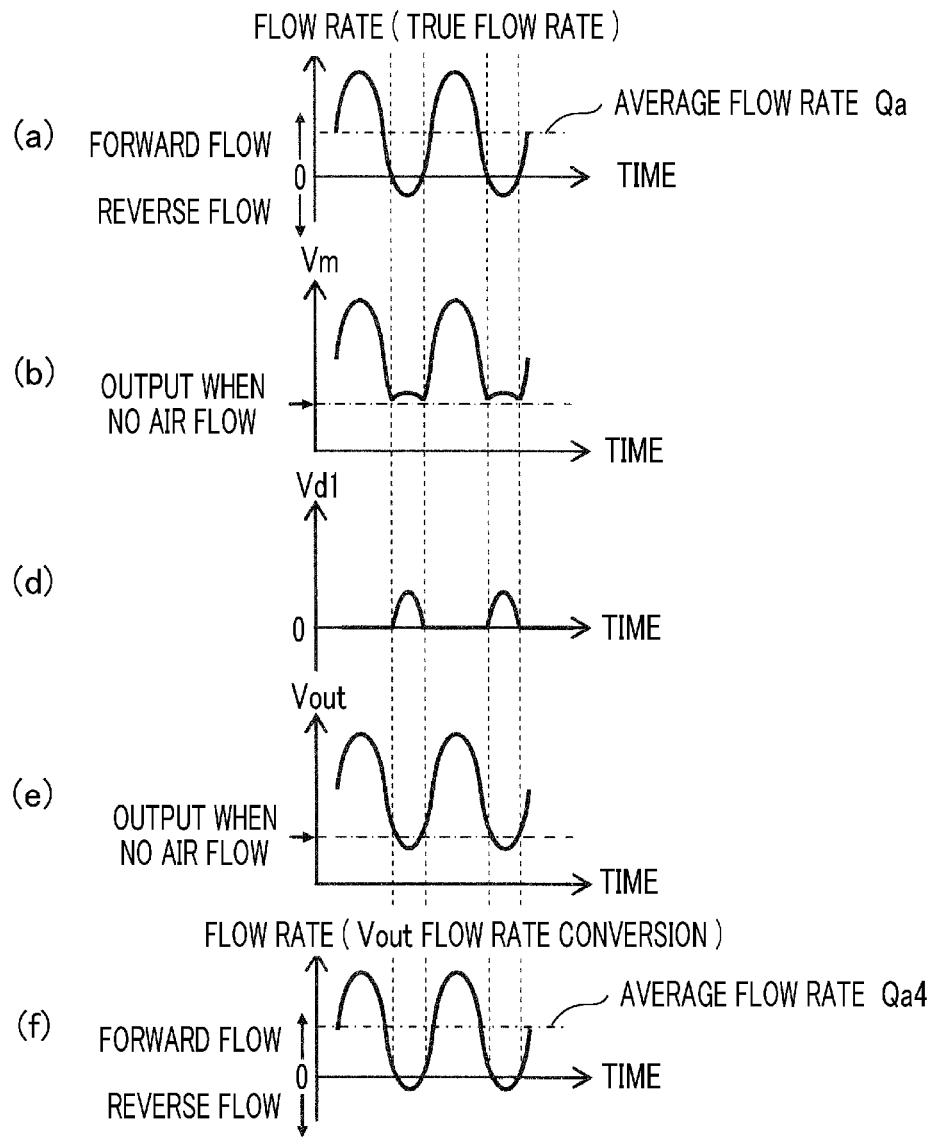
FIG. 14 is an explanatory view showing operating waveforms according to Embodiment 3 of the invention.

In Embodiment 1, the voltage-flow-rate table has been set such that the flow rate=0 when Vout lower than the output when there is no air flow is generated; however as shown in FIG. 13, the voltage-flow-rate table may be set such that the flow rate becomes negative when Vout lower than the output when there is no air flow is generated. Operating waveforms in this Embodiment become as shown in FIG. 14; if Vout in FIG. 14 (e) is flow-rate-converted, a negative flow rate is calculated in part of the reverse flow region as shown in FIG. 14 (f), so a detecting average flow rate Qa4 becomes further smaller than the average flow rate Qa2 in FIG. 6 (f).

Figure 15:
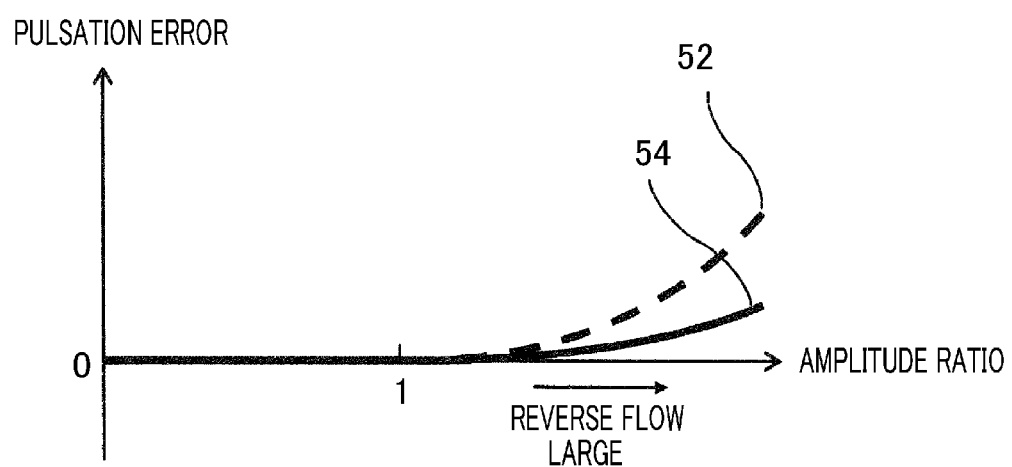
FIG. 15 is an explanatory view showing a pulsation error according to Embodiment 3 of the invention.

If expressed using the relation between the amplitude ratio and pulsation error, the pulsation error becomes as given by the curve 54 in FIG. 15, which is smaller than that given by the curve 52. As described above, the pulsation error when a pulsation flow accompanied with a reverse flow takes place can be reduced in this Embodiment as well.

Embodiment 4

Figure 16:
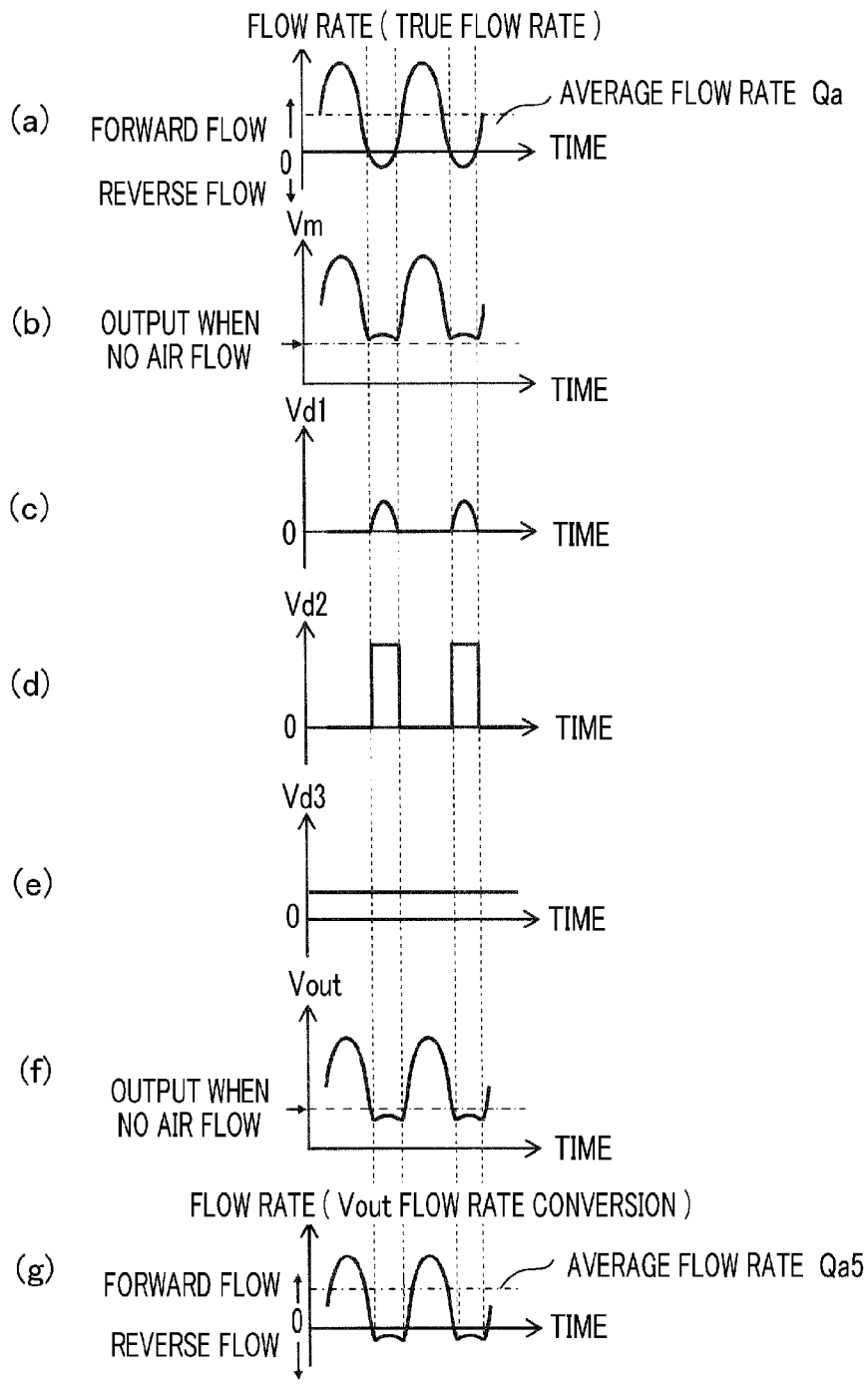
FIG. 16 is an operating waveform view according to Embodiment 4 of the invention.

In Embodiment 2, the voltage-flow-rate table has been also set such that the flow rate=0 when Vout lower than the output when there is no air flow is generated; as shown in FIG. 13, however, the voltage-flow-rate table may be set such that the flow rate becomes negative when Vout lower than the output when there is no air flow is generated. Operating waveforms in this Embodiment become as shown in FIG. 16; if Vout in FIG. 16 (*f*) is flow-rate-converted, a negative flow rate is calculated near the reverse flow region as shown in FIG. 16 (*g*), so a detecting average flow rate Qa5 becomes further smaller than the average flow rate Qa3 in FIG. 11 (*g*).

Figure 17:
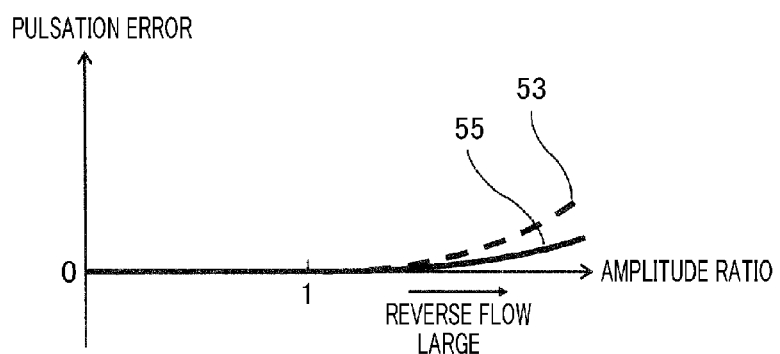
FIG. 17 is an explanatory view showing a pulsation error according to Embodiment 4 of the invention.

If expressed using the relation between the amplitude ratio and pulsation error, the pulsation error becomes as given by the curve 55 in FIG. 17, which is smaller than that given by the curve 53. As described above, the pulsation error when a pulsation flow accompanied with a reverse flow takes place can be reduced in this Embodiment as well.

Embodiment 5

Figure 18:
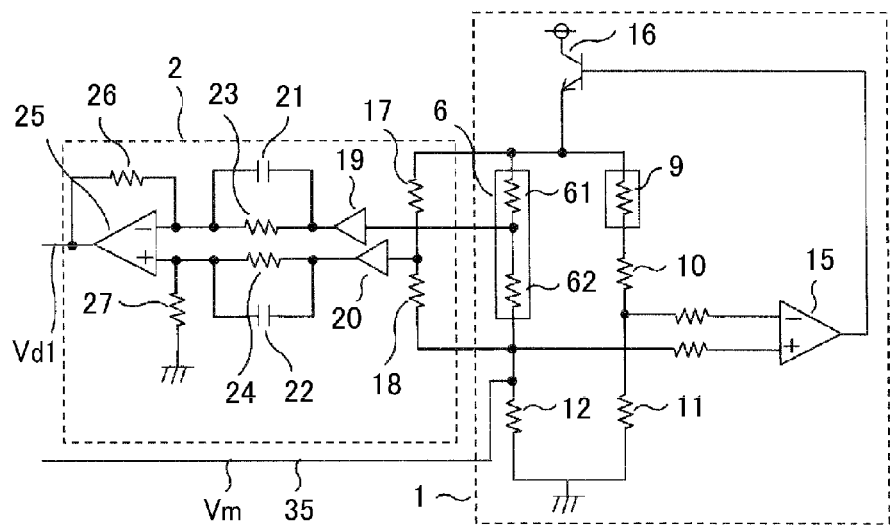
FIG. 18 is a specific circuit configuration diagram according to Embodiment 5 of the invention.

The pulsation error has been corrected in Embodiment by the voltage Vd1 dependent on the difference in temperature between the upstream heating resistor 61 and downstream heating resistor 62; however, a response delay, with respect to the pulsation flow, in the temperatures of the upstream heating resistor 61 and downstream heating resistor 62 sometimes cannot be ignored depending on the structure of the detector 38. In this case, since the amplitude ratio of Vd1 becomes small or phase shift occurs with respect to the pulsation flow, the pulsation correction is likely not to be properly made. In order to solve this problem, in this Embodiment, output from the buffer 19 is connected to the inverting input terminal of the operational amplifier 25 via the resistor 23 and a capacitor 21, and output from the buffer 20 is connected to the non-inverting input terminal of the operational amplifier via the resistor 24 and a capacitor 22 in the differential amplifier unit 2, as shown in FIG. 18. Configuration other than that is the same as that of Embodiment 1. If the capacitance values of the capacitors 21 and 22 are C21 and C22, respectively, the output voltage Vd1 from the operational amplifier 25 is expressed by Equation (10), where R17=R18, Rf=R26=R27, Ri=R23=R24, Ci=C21=C22 and ω=2πf (f: input signal frequency).

Equation 10

$$Vd1 = \frac{Rf}{2Ri}(1 + j\omega CiRi)(Rhu - Rhd)Ih \quad (10)$$

Therefore, the gain G1 in Equation (3) is expressed by Equation (11).

Equation 11

$$G1 = \frac{Rf}{2Ri}(1 + j\omega CiRi) \quad (11)$$

Figure 19:
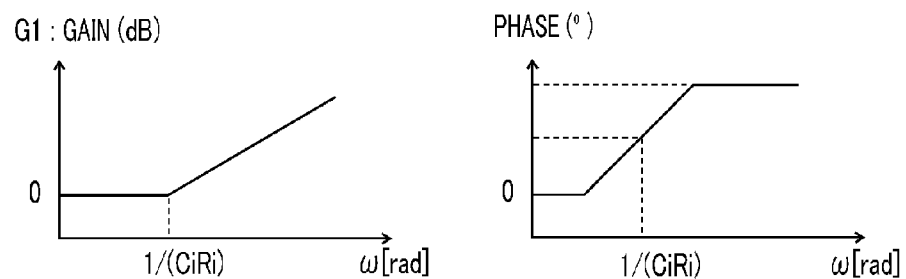
FIG. 19 is an explanatory view showing the frequency characteristics of a differential amplifier unit according to Embodiment 5 of the invention.

As seen from Equation (11), the gain G1 becomes a function of frequency. If expressed in a Bode diagram, frequency dependence of the gain G1 will be as shown in FIG. 19. As seen from FIG. 19, adjusting Ci and Ri enables the gain and phase of Vd1 to be adjusted in accordance with the response delay of the detector 38. As described above, even if the detector 38 has an unignorable thermal response delay, the pulsation error when a pulsation flow accompanied with a reverse flow takes place can be reduced using a simple circuit in this Embodiment.

Additionally, the response delay of Vd1 is compensated by a first-order advance circuit in this Embodiment; however, circuit configuration is not limited to this, but it may be configured with other advance circuits, such as a second-order advance circuit and a digital filter, or with separate gain-and phase-compensating circuits.

Embodiment 6

In Embodiment 5, the gain of the differential amplifier unit 2 has been made higher and the phase has been advanced more as the pulsation frequency becomes higher; however, the gain of the differential amplifier unit 2 may be made higher and the phase may be advanced more as the flow rate becomes larger. If the load status of an engine fluctuates, the pulsation flow generated in the engine also fluctuates with the pulsation frequency and average flow rate nearly proportional to each other; therefore the same effect can be produced even if the flow rate is detected and depending on which the gain and phase of the differential amplifier unit 2 is varied.

Embodiment 7

Figure 20:
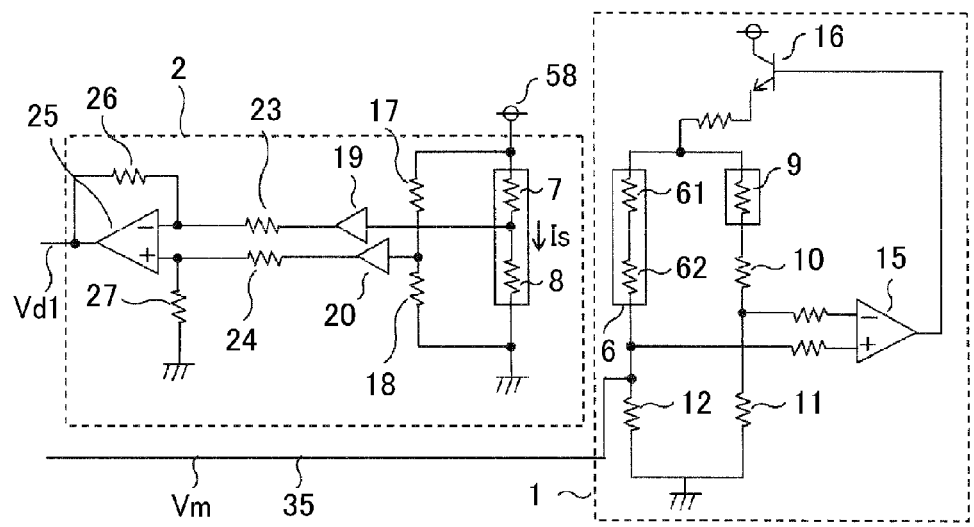
FIG. 20 is a circuit configuration diagram exemplifying a specific circuit according to Embodiment 7 of the invention.

FIG. 20 shows a circuit configuration according to Embodiment 7. An upstream temperature detection resistor 7 formed close to the upstream heating resistor 61 and a downstream temperature detection resistor 8 formed close to the downstream heating resistor 62 are connected in series, and further connected in parallel to the fixed resistors 17 and 18 connected in series having nearly the same resistance value. The connection point between the upstream temperature detection resistor 7 and the fixed resistor 17 is connected to a constant-voltage power supply 58, and the connection point between the downstream temperature detection resistor 8 and the fixed resistor 18 is connected to ground. Moreover, the voltage at the connection point between the upstream temperature detection resistor 7 and downstream temperature detection resistor 8 is input to the buffer 19; the voltage at the connection point between the fixed resistors 17 and 18 is input to the buffer 20. Configuration other than that is the same as that of Embodiment 1. If the resistance value of the upstream temperature detection resistor 7 is Rsu and that of the downstream temperature detection resistor 8 Rsd, the output voltage Vd1 from the differential amplifier unit 2 is expressed by Equation (12).

Equation 12

$$Vd1 = G1(Rsu - Rsd)Is \quad (12)$$

Since the upstream temperature detection resistor 7 is formed close to the upstream heating resistor 61, the temperature of the upstream temperature detection resistor 7 is nearly the same as that of the upstream heating resistor 61; since the downstream temperature detection resistor 8 is formed close to the downstream heating resistor 62, the temperature of the downstream temperature detection resistor 8 is nearly the same as that of the downstream heating resistor 62. Therefore, the voltage Vd1 in this Embodiment becomes positive only when a reverse flow taking place and zero when a forward flow taking place, the same as Embodiment 1. Therefore, the same as Embodiment 1, the pulsation error when a pulsation flow accompanied with a reverse flow takes place can be reduced in this Embodiment as well.

Figure 21:
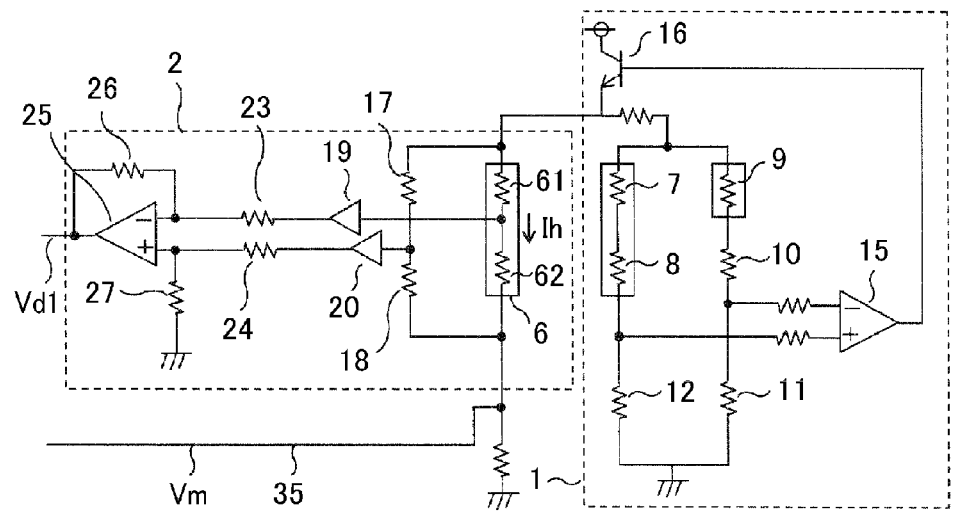
FIG. 21 is a circuit configuration diagram exemplifying another specific circuit according to Embodiment 7 of the invention.
Figure 22:
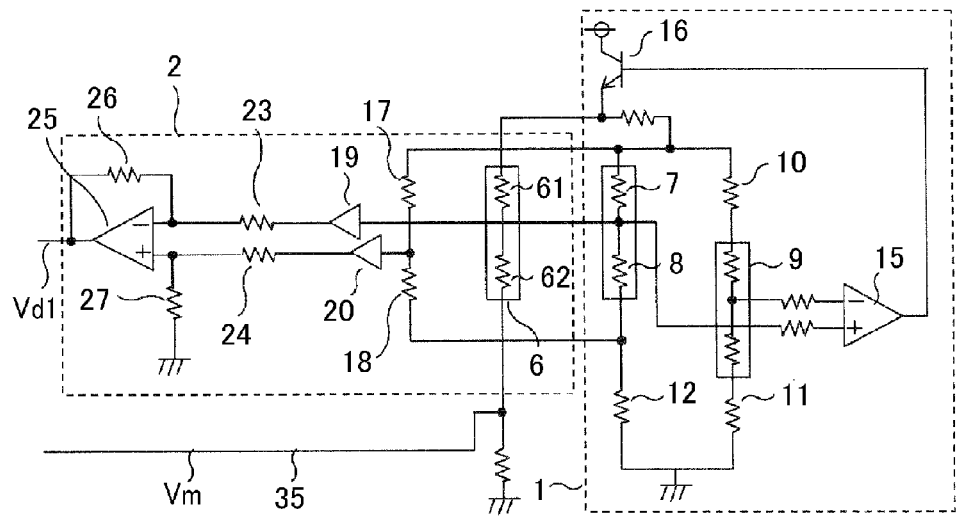
FIG. 22 is a circuit configuration diagram exemplifying still another specific circuit according to Embodiment 7 of the invention.

Only the resistors 23 and 24 are connected to the respective input terminals of the operational amplifier 25 in FIG. 20; however, capacitors may be connected the same as FIG. 18 in Embodiment 5, so that the gain and phase of the differential amplifier unit 2 are varied depending on frequency. Moreover, the configuration of the bridge circuit unit 1 is not limited to those shown in FIG. 18 and FIG. 20, but it may be those shown in FIG. 21 and FIG. 22 as long as difference in temperature between upstream and downstream portions with respect to the air flow can be detected.

Embodiment 8

It is ideal that temperatures of the upstream temperature detection resistor 7 and downstream temperature detection resistor 8 are the same when there is no air flow, and the resistance values of both resistors are the same when their temperatures are the same. However, the temperatures of the upstream temperature detection resistor 7 and downstream temperature detection resistor 8 are not always the same even when there is no air flow, due to variations in their actual structure; in most cases both resistance values are not the same even when their temperatures are the same. If there is any imbalance between the upstream temperature detection resistor 7 and downstream temperature detection resistor 8 described above, the output voltage Vd1 from the differential amplifier unit 2 sometimes becomes positive even when a forward flow taking place, or zero even when a reverse flow taking place, thereby making it difficult to properly judge between the forward and reverse flows.

Figure 23:
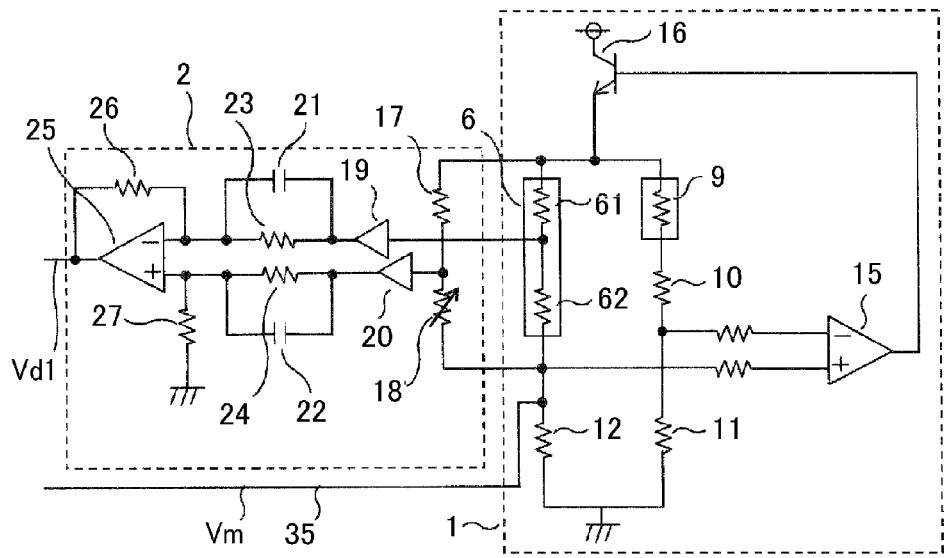
FIG. 23 is a circuit configuration diagram exemplifying a specific circuit according to Embodiment 8 of the invention.

So in this Embodiment, a variable resister is used for at least one of the fixed resistors 17 and 18. FIG. 23 shows an example in which the fixed resistor 18 in FIG. 18 is replaced with a variable resistor. Even if there is any imbalance between the upstream temperature detection resistor 7 and downstream temperature detection resistor 8, the voltage Vd1 can be adjusted, by adjusting this variable resistor, to become positive only when a reverse flow taking place. Therefore, this Embodiment enables the judgment between the forward and reverse flows to be made properly.

Embodiment 9

Figure 24:
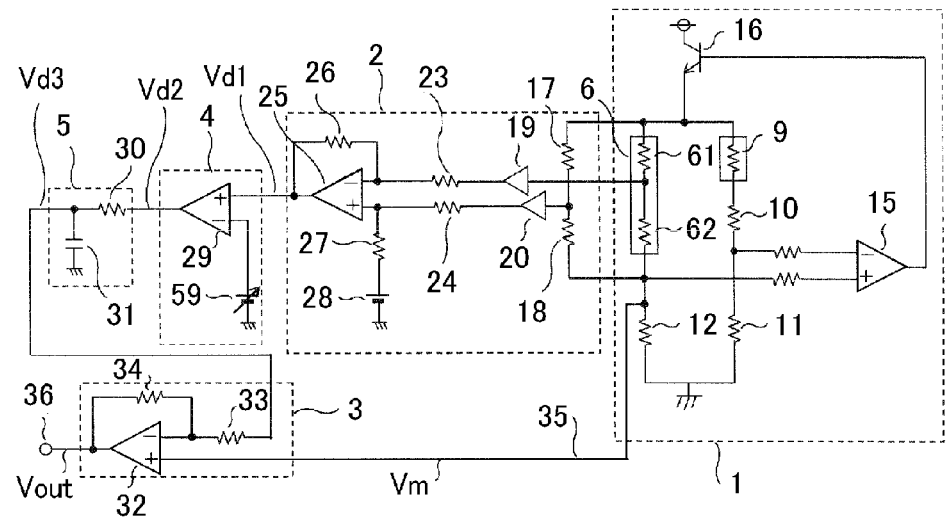
FIG. 24 is a circuit configuration diagram exemplifying a specific circuit according to Embodiment 9 of the invention.

In this Embodiment, if there is any imbalance between the upstream temperature detection resistor 7 and downstream temperature detection resistor 8 described in Embodiment 8, the adjustment therefor is made as shown in FIG. 24 by adjusting a reference voltage supply 59 for the comparator 29. For example, when Vd1 becomes positive when a forward flow taking place, due to imbalance between the upstream temperature detection resistor 7 and downstream temperature detection resistor 8, the output Vd2 from the pulse converter 4 becomes 'High' voltage; however, Vd2 can be made 'Low' voltage by adjusting the voltage of the reference voltage supply 59 for the comparator 29 to increase. On the contrary, when Vd1 becomes zero when a reverse flow taking place, the output Vd2 from the pulse converter 4 becomes 'Low' voltage; however, Vd2 can be made 'High' voltage by adjusting the voltage of the reference voltage supply 59 for the comparator 29 to decrease.

As described above, the judgment between the forward flow and reverse flow can be properly made in Embodiment using the pulse converter 4, by adjusting the voltage of the reference voltage supply 59 for the comparator 29.

Embodiment 10

In normal operation, the output Vd2 from the pulse converter 4 in Embodiment 2 described above becomes 'Low' voltage when a forward flow taking place, whereas 'High' voltage when a reverse flow taking place; however, chattering arises due to disturbance noise and turbulent flows in a flow rate region before or after the time of no air flow, and a pulse signal with extremely high frequency is sometimes generated. In this case, it becomes difficult to properly make the judgment between the forward flow and reverse flow.

Figure 25:
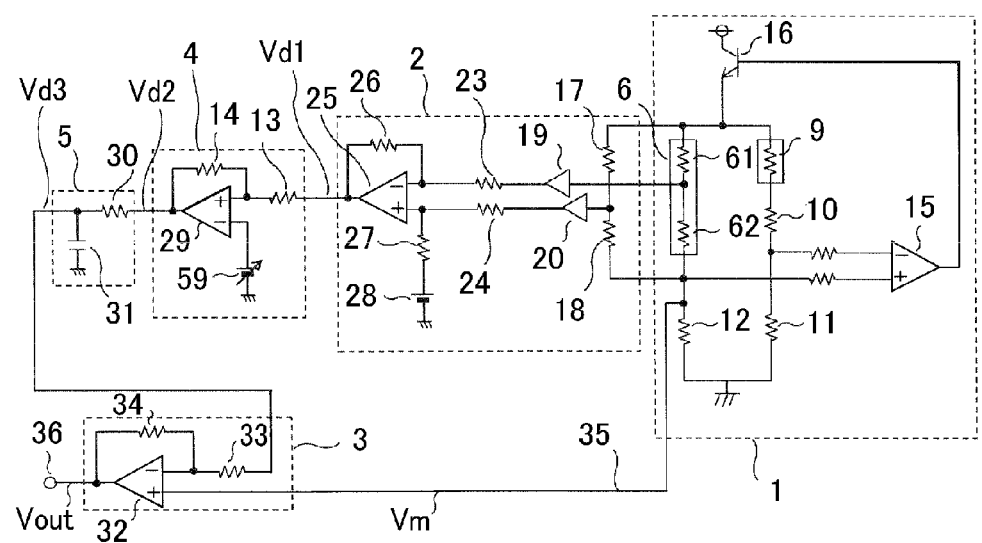
FIG. 25 is a circuit configuration diagram exemplifying a specific circuit according to Embodiment 10 of the invention.

So in this Embodiment, the output from the comparator 29 is divided by fixed resistors 13 and 14 and the divided voltage is fed back to an input terminal of the comparator 29 as shown in FIG. 25, so as to provide it with hysteresis. The chattering can be prevented from arising by making this hysteresis width an appropriate value, without responding to the disturbance noise and turbulent flows.

Embodiment 11

Figure 26:
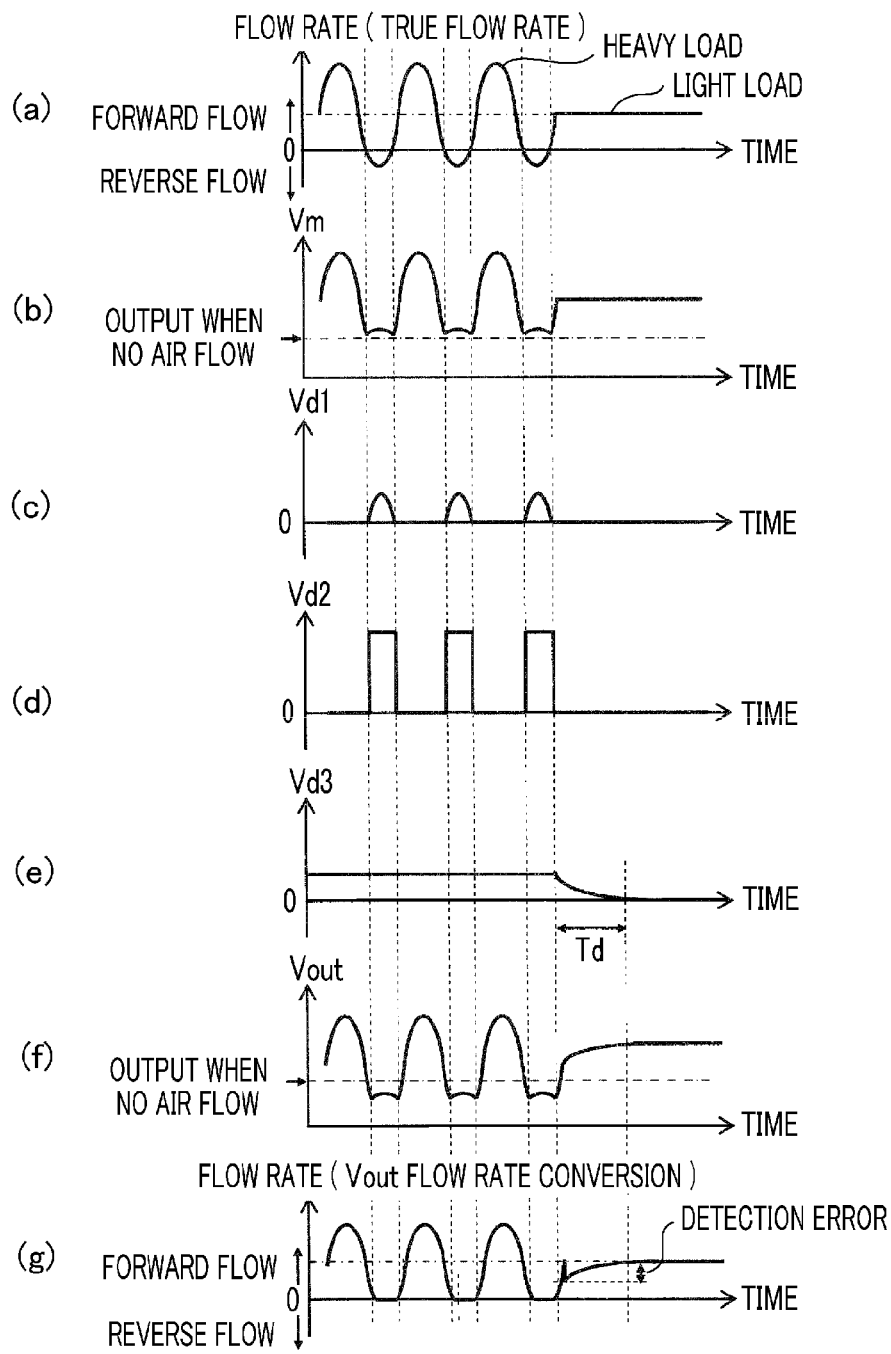
FIG. 26 is an explanatory view showing operating waveforms for explaining Embodiment 11 of the invention.

In Embodiment 2, the output Vd2 from the pulse converter 4 shown in FIG. 11 (*d*) is smoothed by the LPF 5 to become the waveform shown in FIG. 11 (*e*). The pulsation frequency of an engine is generally higher than 20 Hz; therefore the cutoff frequency of the LPF 5 must be at least lower than 2 Hz in order to smooth a waveform with this frequency. However, when pulsation conditions are suddenly changed, there arises a delay in the processing by the LPF 5 and an error is likely to occur in the output from the subtraction processor 3. For example, when the engine is suddenly shifted from a heavy-load state to a light-load state, a state of pulsation flow accompanied with a reverse flow taking place is suddenly changed into a state of no pulsation. Operating waveforms in this case are shown in FIG. 26. As shown in FIG. 26 (*a*), when the heavy-load state (pulsation state with a reverse flow) is suddenly changed to the light-load state (state of a constant flow rate without pulsation flow), the bridge output voltage Vm demonstrates quick response as shown in FIG. 26 (*b*); however, the output Vd3 from the LPF 5 takes a time Td before it settles into the light-load state as shown in FIG. 26 (*e*), caused by a delay by the low-pass filter. Since Vd3 input to the subtraction processor 3 varies during this time, Td, the output voltage Vout from the subtraction processor 3 also varies as shown in FIG. 26 (*f*). The result of flow-rate conversion of this Vout becomes as shown in FIG. 26 (*g*), which indicates a detection error occurring during the time Td.

The higher the pulsation frequency is, the shorter the period for calculating the average flow rate becomes; therefore the higher the pulsation frequency is, the greater influence by the LPF 5 on the delay becomes. If the cutoff frequency of the LPF 5 is increased to avoid this phenomenon, the pulse waveform cannot be completely smoothed when the pulsation frequency is low.

Figure 27:
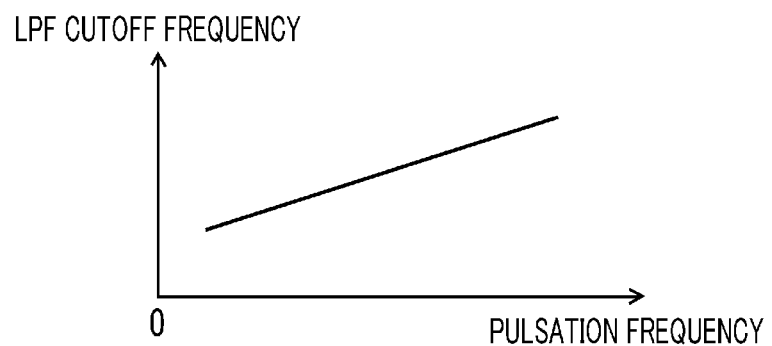
FIG. 27 is an explanatory view showing the frequency dependence of the cutoff frequency of an LPF according to Embodiment 11 of the invention.
Figure 28:
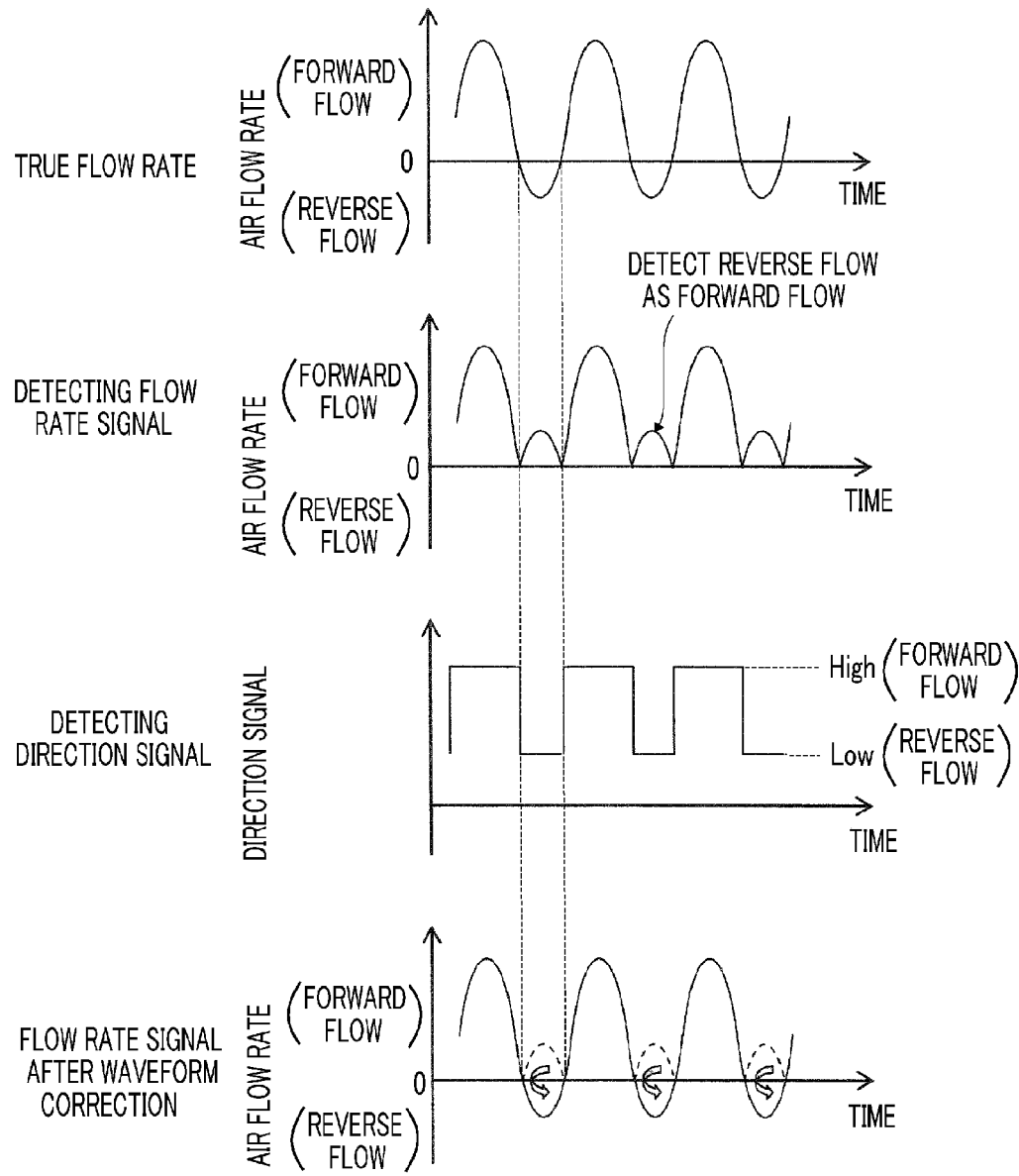
FIG. 28 is an explanatory view for explaining a conventional example.
Figure 29:
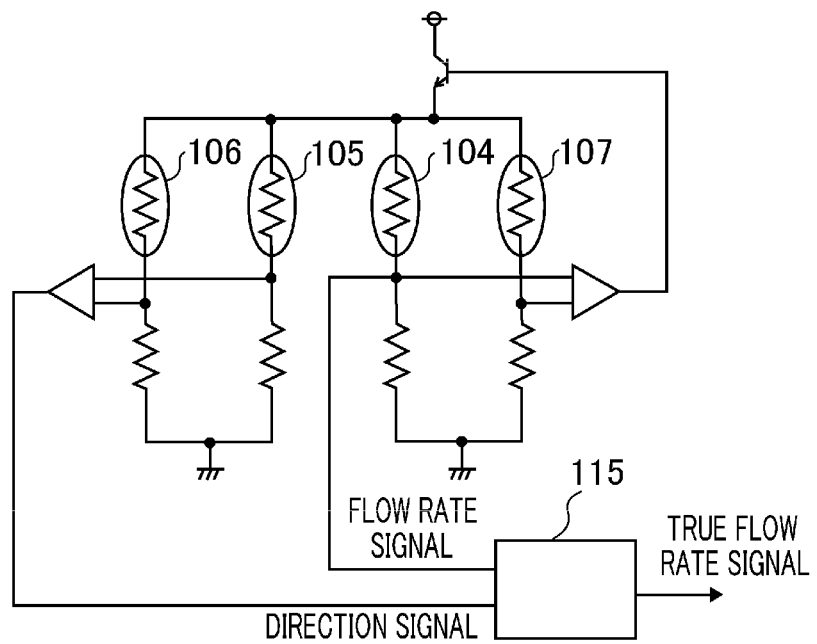
FIG. 29 is an explanatory view for explaining another conventional example.
Figure 30:
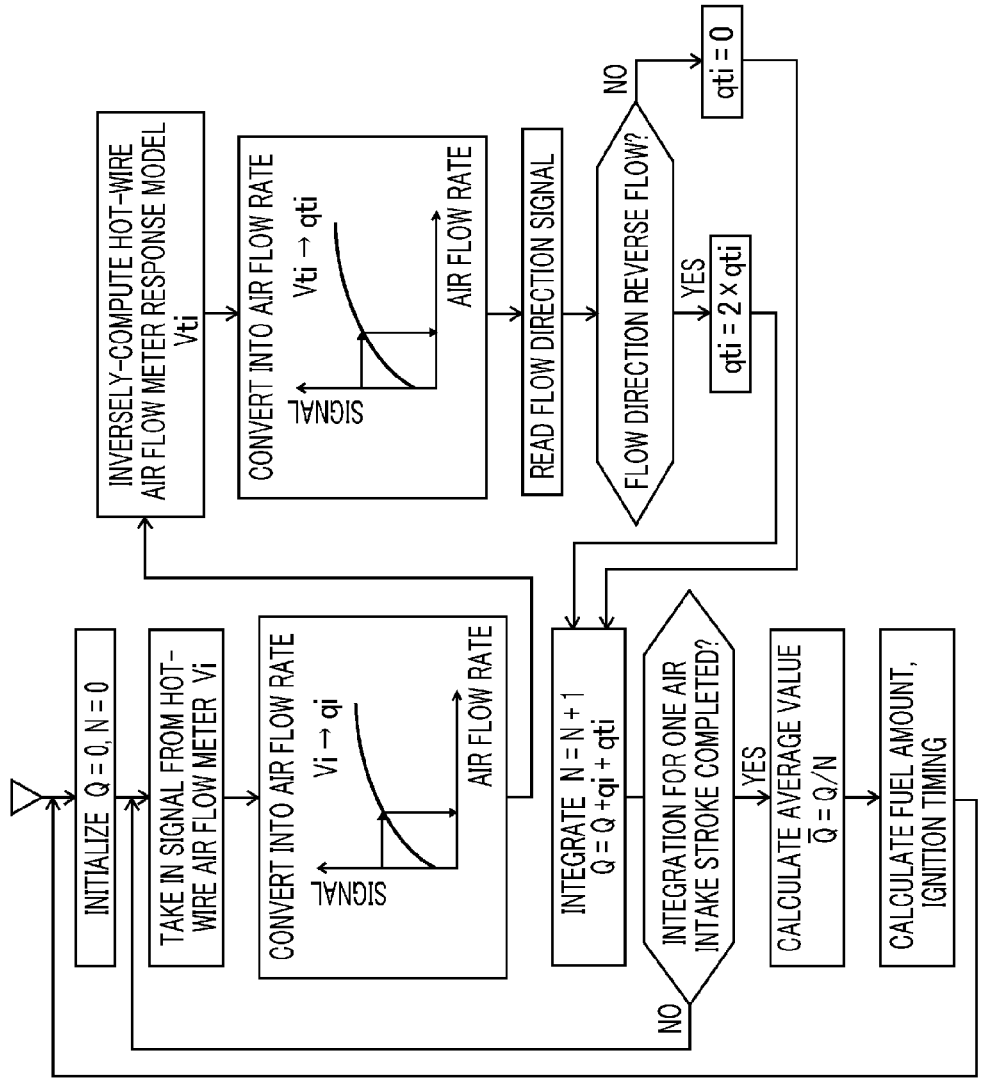
FIG. 30 is an explanatory view for explaining still another conventional example.

So, the cutoff frequency of the LPF 5 is varied in this Embodiment depending on the pulsation frequency. The cutoff frequency of the LPF 5 is decreased when the pulsation frequency is low, whereas increased when it is high, as shown in FIG. 27. Thereby, the pulse waveform can be properly smoothed regardless of the pulsation frequency, and in addition the delay by the LPF 5 becomes small when the pulsation frequency is high; therefore the detection error due to this delay can be also reduced. As described above, even when a pulsation state is suddenly changed, pulsation correction can be accurately made in this Embodiment.

Additionally, embodiments according to the present invention can be freely combined, or suitably modified or deleted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A thermal air flow meter including:
   a bypass that takes in part of intake air to be measured and allows the intake air to flow therethrough;
   a flow rate detection element that is disposed in the bypass and includes a heating resistor made up of an upstream heating resistor located upstream of the intake air and a downstream heating resistor located downstream of the intake air, and an intake-air temperature detection resistor that detects the intake air temperature; and a bridge circuit unit that incorporates a bridge circuit including the heating resistor and supplies a current to the heating resistor so that the heating resistor temperature is always set higher by a predetermined temperature than the intake air temperature detected by the intake-air temperature detection resistor; wherein the bridge circuit unit outputs an output signal based on a value of the current supplied to the heating resistor, in accordance with a flow rate of the intake air;

the thermal air flow meter comprising:

a differential amplifier unit that amplifies a voltage dependent on difference in temperature between the upstream heating resistor and the downstream heating resistor; and a subtraction processor that subtracts from the output signal a constant times output from the differential amplifier unit, and outputs a correction output signal.

2. A thermal air flow meter according to claim 1, wherein the subtraction processor includes a pulse converter that converts the output from the differential amplifier unit into a pulse waveform and an LPF that smoothes output from the pulse converter, and subtracts from the output signal a constant times output from the LPF.

3. A thermal air flow meter according to claim 2, wherein a first reference voltage is added to the output from the differential amplifier and the resultant voltage is made the output from the differential amplifier unit, the pulse converter includes a comparator, a second reference voltage and the output from the differential amplifier unit are input to the comparator, and the pulse converter outputs a high-level voltage when the output from the differential amplifier unit is higher than the second reference voltage, whereas the pulse converter outputs a low-level voltage when the output from the differential amplifier unit is lower than the second reference voltage.

4. A thermal air flow meter according to claim 3, wherein the second reference voltage is variable.

5. A thermal air flow meter according to claim 3, wherein the comparator is provided with hysteresis.

6. A thermal air flow meter according to claim 2, wherein the cutoff frequency of the LPF is varied depending on the frequency of an input signal thereto.

7. A thermal air flow meter according to claim 1, wherein the differential amplifier unit incorporates a differential amplifier including an operational amplifier, resistors and capacitors, and is configured in such away that the gain of the differential amplifier increases as the frequency of a signal input to the differential amplifier becomes higher.

8. A thermal air flow meter according to claim 1, wherein the differential amplifier unit incorporates a differential amplifier including an operational amplifier, resistors and capacitors, and is configured in such a way that the phase of output from the differential amplifier is advanced more as the frequency of the signal input to the differential amplifier becomes higher.

9. A thermal air flow meter according to claim 1, wherein the differential amplifier unit incorporates a differential amplifier including an operational amplifier, resistors and capacitors, and is configured in such away that the gain of the differential amplifier and the phase of the output from the differential amplifier are varied based on the intake air flow rate.

10. A thermal air flow meter according to claim 1, wherein two resistors connected in series having nearly the same resistance value are connected in parallel to the heating resistor, a voltage at a connection point between the two resistors is applied via a buffer to one of the terminals of the differential amplifier, and a voltage at a connection point between the upstream heating resistor and the downstream heating resistor is applied via another buffer to the other terminal of the differential amplifier.

11. A thermal air flow meter according to claim 10, wherein at least one of the two resistors connected in series is a variable resister.

12. A thermal air flow meter according to claim 1, wherein an upstream temperature detection resistor formed close to the upstream heating resistor and a downstream temperature detection resistor formed close to the downstream heating resistor are connected in series, two resistors connected in series having nearly the same resistance value are connected in parallel to the upstream temperature detection resistor and the downstream temperature detection resistor connected in series, a voltage at a connection point between the two resistors is applied via a buffer to one of the terminals of the differential amplifier, and a voltage at a connection point between the upstream temperature detection resistor and the downstream temperature detection resistor is applied via another buffer to the other terminal of the differential amplifier.

13. A method for using thermal air flow meter according to claim 1, wherein an output-flow-rate table for converting the correction output signal into the flow rate includes a negative flow rate region.

* * * * *